(12) United States Patent
Krishnan et al.

(10) Patent No.: US 10,970,549 B1
(45) Date of Patent: *Apr. 6, 2021

(54) VIRTUAL ASSISTANT OF SAFE LOCKER

(71) Applicant: Wells Fargo Bank, N.A., San Francisco, CA (US)

(72) Inventors: Gothandapani Krishnan, Bangalore (IN); Shanmukeswara Rao Donkada, Hyderabad (IN); Madeshwaran Mohanraj, Bangalore (IN); Ramanathan Ramanathan, Bellevue, WA (US); Jayakrishna Nair, Bengaluru (IN); Parthasarathy Venkatesan, Bangalore (IN); Kalyan Chandra Kothamasu, Bangalore (IN); Manpreet Singh, Guwahati (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,197

(22) Filed: Apr. 12, 2019

Related U.S. Application Data

(63) Continuation-in-part of application No. 16/277,573, filed on Feb. 15, 2019, which is a continuation of
(Continued)

(51) Int. Cl.
*G06K 9/00* (2006.01)
*G08B 13/196* (2006.01)
(Continued)

(52) U.S. Cl.
CPC ......... *G06K 9/00671* (2013.01); *G06F 21/32* (2013.01); *G08B 13/19656* (2013.01); *H04N 7/183* (2013.01)

(58) Field of Classification Search
CPC ............... G06K 9/00671; H04N 7/183; G08B 13/19656; G06F 21/32
See application file for complete search history.

(56) References Cited

U.S. PATENT DOCUMENTS 6,707,381 B1 * 3/2004 Maloney .............. G07G 1/0054
340/568.1
9,135,491 B2 * 9/2015 Morandi .................. G06K 9/00
(Continued)

FOREIGN PATENT DOCUMENTS

CN 102852426 1/2013
CN 203654991 6/2014
(Continued)

*Primary Examiner* — Francis Geroleo
(74) *Attorney, Agent, or Firm* — Walter Haverfield LLP; James J. Pingor (57) ABSTRACT

The innovation disclosed and claimed herein, in one aspect thereof, comprises systems and methods of providing valuation of safety deposit boxes. The systems and methods provide a portal to digitally access a locker by a user. The systems and methods receive a request to access the locker from the user and authenticate the user to provide access. The systems and methods scan items placed within the locker. The systems and methods evaluate at least one item of the plurality of items placed inside the locker for digitized metrics to determine a valuation for the items in the safe locker. The systems and methods provide a portal for the locker such that an owner of the locker has exclusive access to the plurality of items and the digitized metrics.

19 Claims, 7 Drawing Sheets

Related U.S. Application Data application No. 15/812,155, filed on Nov. 14, 2017, now Pat. No. 10,242,263.

(51) Int. Cl.
  *G06F 21/32* (2013.01)
  *H04N 7/18* (2006.01)

(56) References Cited

U.S. PATENT DOCUMENTS

| | | | |
|---|---|---|---|
| 9,317,987 B2 | 4/2016 | Cleveland et al. | |
| 2007/0271596 A1 | 11/2007 | Boubion et al. | |
| 2009/0261981 A1* | 10/2009 | Jones | G01G 19/414 340/666 |
| 2013/0340656 A1* | 12/2013 | Rainier | E05G 1/02 109/38 |
| 2015/0193733 A1* | 7/2015 | Bouzit-Benbernou | G06Q 50/28 705/332 |
| 2015/0332528 A1 | 11/2015 | McGinnis et al. | |
| 2017/0103643 A1 | 4/2017 | Powers et al. | |
| 2018/0033235 A1 | 2/2018 | Dotterweich et al. | |
| 2018/0232771 A1 | 8/2018 | Lenahan et al. | |
| 2019/0122046 A1* | 4/2019 | Wantland | G06N 20/00 |
| 2019/0188796 A1* | 6/2019 | Sauer | G06K 9/00671 |
| 2020/0059363 A1* | 2/2020 | Lobo | G06Q 20/389 |

FOREIGN PATENT DOCUMENTS

| | | |
|---|---|---|
| CN | 105298298 | 2/2016 |
| CN | 105611616 | 5/2016 |
| WO | 2010106552 | 9/2010 |

* cited by examiner

VIRTUAL ASSISTANT OF SAFE LOCKER

CROSS-REFERENCE TO RELATED APPLICATION

This application is a continuation-in-part of U.S. application Ser. No. 16/277,573, filed on Feb. 15, 2019 and entitled "VIRTUAL ASSISTANT OF SAFE LOCKER", which is a continuation of co-pending U.S. application Ser. No. 15/812,155, filed on Nov. 14, 2017, entitled "VIRTUAL ASSISTANT OF SAFE LOCKER." The entirety of the above-noted applications are incorporated by reference herein.

BACKGROUND

Safety deposit boxes are common tools for customers at almost any branch of a financial institution. The safety deposit boxes provide a physical locker that keep important documents, valuables, and/or the like safe and secure from thieves, accidental damage, and/or the like. However, the safety deposit box is a physical element that requires customers to physically be at the branch to access the locker and know what is contained within it. Oftentimes, a customer will make a special visit to the branch out of the customer's way just to verify their belongings are safe and still within the locker. There is a user for a customer to have visual access to the locker to confirm their belongings are safe and know what is in the locker.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of valuation of a safe locker. The systems and methods provide a locker that is accessible via a portal, wherein the locker facilitates storage of a plurality of items. The systems and methods evaluate at least one item of the plurality of items placed inside the locker for digitized metrics to determine a valuation for the items in the safe locker. The systems and methods provide a portal for the locker such that an owner of the locker has exclusive access to the plurality of items and the digitized metrics.

In aspects, the subject innovation provides substantial benefits in terms of access to safety deposit boxes and user experience. One advantage resides in access to safety deposit boxes without a physical presence. Another advantage resides in a more knowledge of the value of items contained within a safety deposit box.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Figure 1:
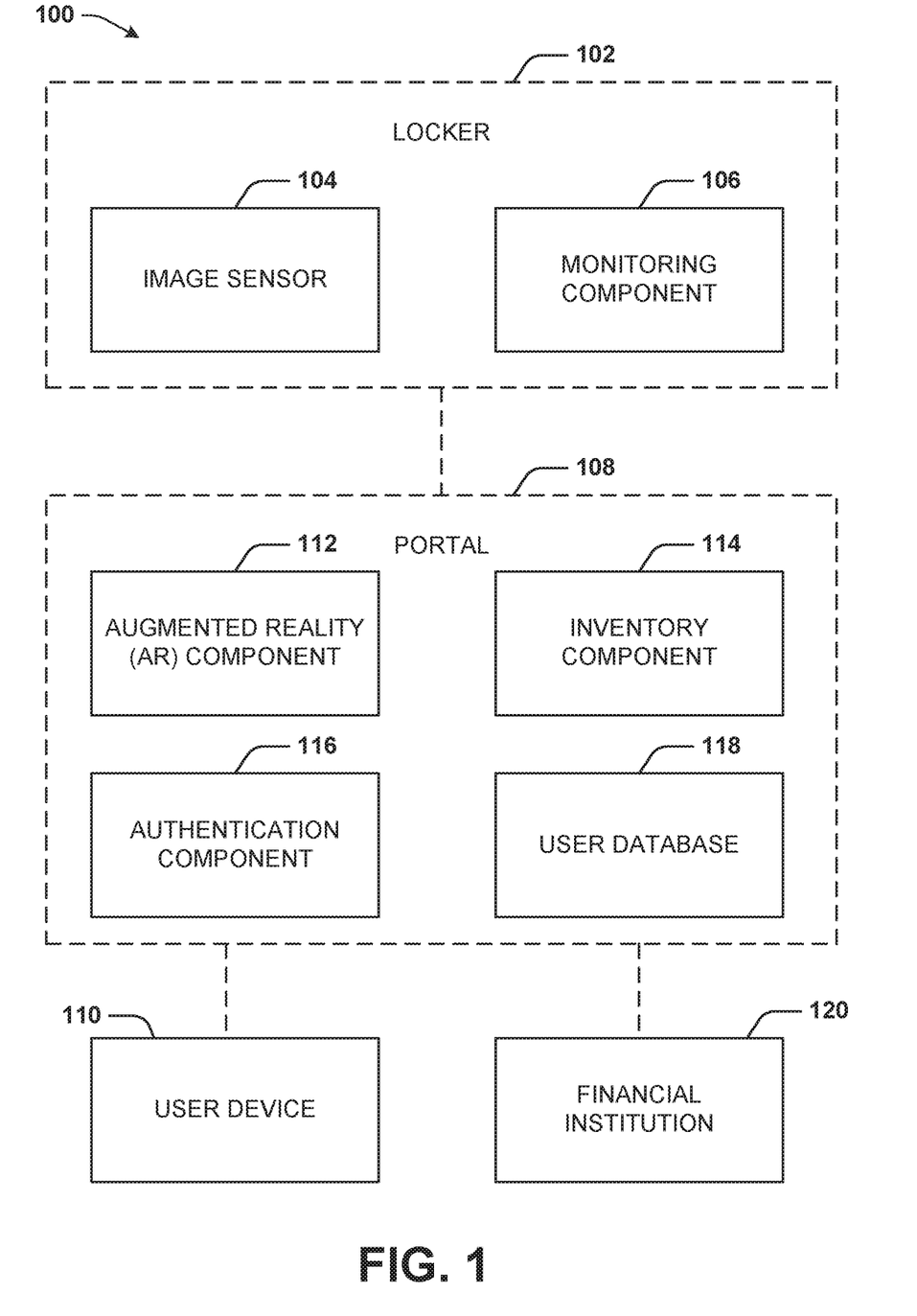
FIG. 1 illustrates an example component diagram of a system of the present innovation.

FIG. 1 illustrates an example component diagram of a system 100 for providing augmented locker images to a user. The system 100 includes a locker 102. The locker 102 is a secured space and/or area that can be locked via a locking mechanism (not shown) and/or the like. The locker 102 can be a safety deposit box, secure locker, lockbox, safe, vault, and/or the like. In some embodiments, the locker 102 is a safety deposit box associated with a financial institution and is physically located in a vault of a branch of the financial institution.

The locker 102 includes an image sensor 104. The image sensor 104 can be a still image camera, video camera, and/or the like to capture images of the locker 120. In some embodiments, the image sensor 104 can be permanently attached within the locker 102 or temporarily attached within the locker 102. The image sensor 104 captures an image of the interior of the locker to document the contents within the locker. In some embodiments, the locker 102 can include multiple or an array of image sensors 104 to provide different viewing angles of the locker 102 interior.

In other embodiments, a three dimensional image can be created of the interior of the locker 102. The three dimensional image can be created using multiple cameras or three dimensional image analysis. The image analysis can make reasonable inferences to create a three dimensional image of the locker 102. The three dimensional image can be navigated by a user viewing the image to access different views of items within the locker 102.

In some embodiments, the image sensor 104 can be triggered to capture an image over a network by a third party entity. The locker 102 can include a monitoring component 106. The monitoring component 106 can determine the locker 102 has been accessed. In some embodiments, the monitoring component 106 detects movement of the locker 102 to determine the locker 102 has been moved. In other embodiments, the monitoring component 106 is a light sensor to detect when the locker 102 is or has been opened. In another embodiment, the monitoring component 106 is connected to the locking mechanism of the locker 102 to determine when the locker 102 has been unlocked and/or locked. The monitoring component 106 determines a change condition of the locker 102 and can trigger the image sensor 104 to capture an image of the interior of the locker 102. In other embodiments, the image sensor 104 can be scheduled to capture an image of the locker 102 either periodically or a scheduled date/time.

The system 100 includes a portal 108. The portal 108 can be an access point for a user associated with the locker 102 to view images of the locker 102 captured by the image sensor 104. In some embodiments, the portal 108 is a web site accessible over servers and/or the internet. The image sensor 104 captures an image of the interior of the locker 102 and provides the image and/or image data to the portal 108. The portal 108 can be accessed by a user device 110 associated with the user. The portal 108 can provide the images associated with the user's locker 102 to the user device 110.

In some embodiments, the image sensor 104 and/or the locker 102 can receive a request to capture an image of the locker 102 from a user via a user device 110. The user provides the request which triggers the image sensor 104 to capture an image and provide an image and/or an augmented image described below.

The portal 108 includes an augmented reality (AR) component 112. The AR component 112 receives an image(s) from the image sensor 104 via the locker 102 and/or the portal 108. The AR component 112 analyzes an image of the locker 102 for identification of items within the locker 102. The AR component 112 utilizes identification algorithms to tag or recognize items within the locker.

The AR component 112 can generate an augmented image having a user interface overlaid on the original image that displays tags for identified items within the locker 102. For example, a user places an engagement ring and a passport within the locker 102. An image is captured of the engagement ring and passport within the interior of the locker 102. The AR component 112 receives and analyzes the image to identify and tag the engagement ring as "Ring" and the passport as "Passport." The AR component 112 overlays the tags onto the image to create an augmented image. The user can access the augmented image via the portal 108 to view the augmented image on their user device 110.

In some embodiments, the AR component 112 can augment the image according to a privacy (or redaction) selection. A user (or customer) may want to redact private documents or personal items so that the AR component 112 does not identify the items or the redacted items cannot be viewed via the portal 108. In some embodiments, the privacy selection is made by a user. The user can view the image taken of the interior of the locker and make selections to items to redact or exclude from the image.

For example, the user has a will within his locker that he does not want to appear in the augmented image out of privacy concerns. The user locates the will in the image and selects the will to be redacted. In some embodiments, the user can define boundaries within the image to be redacted. In other embodiments, the user can receive an identification of the will from the AR component 112, and select the identified will to be redacted.

The AR component 112 can redact items by changing the pixels within the image associated with the item. For example, the items can be redacted by a blurring function to hide details of the item. In an alternate example, the item's pixels can be changed to black to block all details of item from being viewed in the image.

In other embodiments, the AR component 112 can receive a privacy level selection from a user. The privacy level can be low, medium, or high. The AR component 112 determines items to be redacted from the augmented image based on the privacy level selection. The AR component 112 redacts one or more items within the image such that the one or more items do not appear in the annotated image.

The portal 108 includes an inventory component 114. The inventory component 114 can create and store a list of items within the locker 102. The inventory component 114 receives the created tags from the AR component 112 and compiles a list that is associated with the user. The user may access the list via the portal 108 and/or inventory component 114. In some embodiments, the inventory component 114 can generate an email, and/or notification and communicate the list to the user and/or the user device 110.

The portal 108 includes an authentication component 116. When a user attempts to access the portal 108 to view images of the locker 102, the user may be authenticated by the authentication component 116. The authentication component 116 can receive a password associated with the user. User data such as passwords, login names, locker number, account information, biometric data, and/or the like can be stored in a user database 118. In some embodiments, the authentication component 116 can match user biometric data to stored biometric data in the user database 118 to determine or confirm the identity of the payee and/or payer. In some embodiments, the authentication component 116 authenticates the user and the portal 108 retrieves account information from the financial institution 118 or financial institution server to determine the locker 102 associated with the user.

Figure 2:
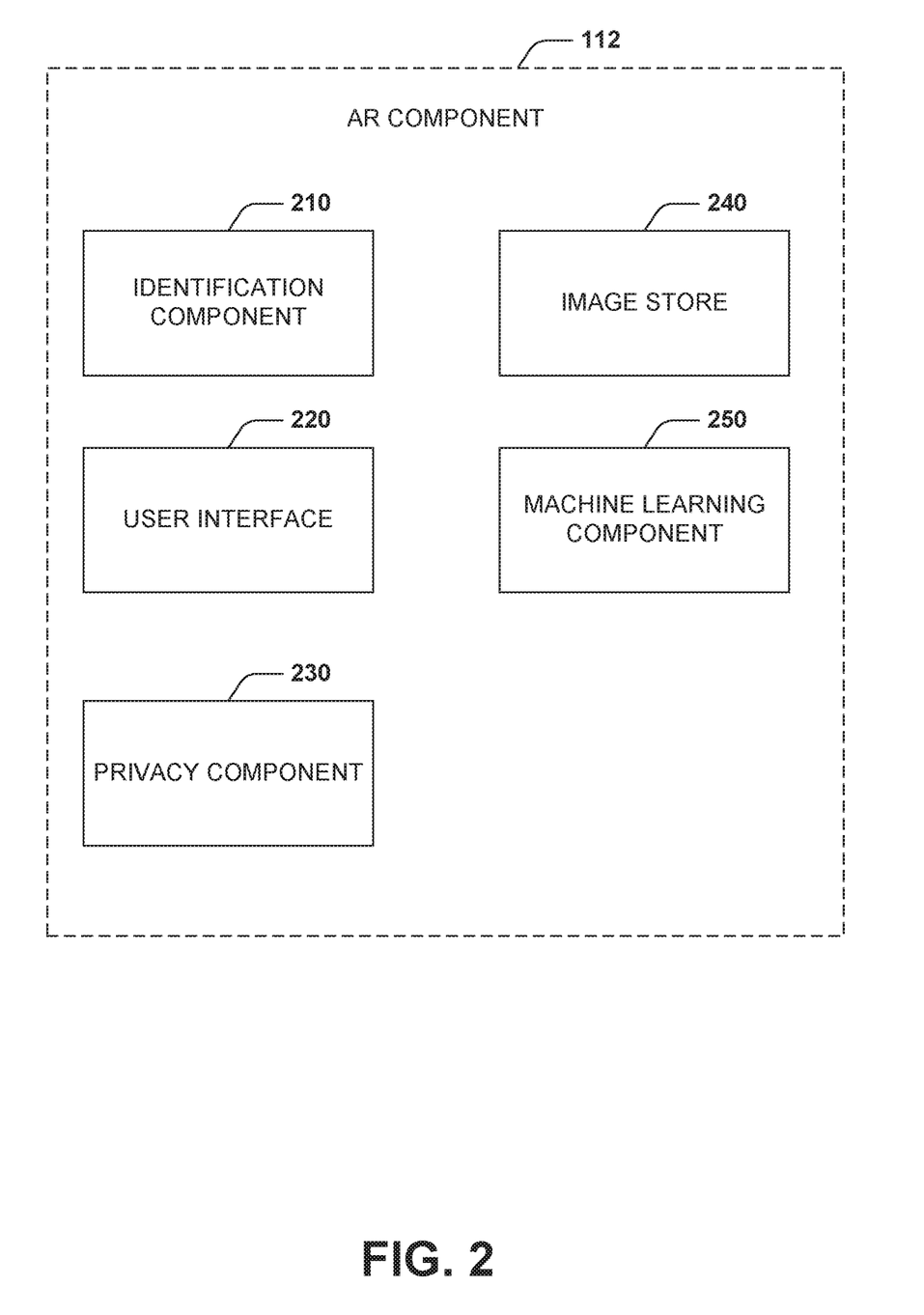
FIG. 2 illustrates an example component diagram of an augmented reality component.

FIG. 2 illustrates a detailed component diagram of the AR component 112. The AR component 112 receives an image(s) from the image sensor 104 via the locker 102 and/or the portal 108. The AR component 112 includes an identification component 210 that analyzes an image of the locker 102 for identification of items within the locker 102. The identification component 210 utilizes identification algorithms to tag or recognize items within the locker 102.

The AR component 112 includes a user interface 220 that can generate an augmented image having tags overlaid on the original image that displays tags for identified items within the locker 102. For example, a user places an engagement ring and a passport within the locker 102. An image is captured of the engagement ring and passport within the interior of the locker 102. The AR component 112 receives and analyzes the image to identify and tag the engagement ring as "Ring" and the passport as "Passport." The AR component 112 overlays the tags onto the image to create an augmented image. The user can access the augmented image via the portal 108 to view the augmented image on their user device 110.

The AR component 112 can include a privacy component 230. In some embodiments, the privacy component 230 can augment the image according to a privacy (or redaction) selection. A user (or customer) may want to redact private documents or personal items so that the AR component 112 does not identify the items and maintains the user's privacy. In some embodiments, the privacy component 230 receives a privacy selection made by a user. The user can view the image taken of the interior of the locker and make selections to items to redact or exclude from the image via the privacy component 230. For example, the user has a will within his locker that he does not want to appear in the augmented image. The user uses the privacy component 230 to locate the will in the image and selects the will to be redacted.

In some embodiments, the privacy component 230 can receive boundaries within the image to be redacted. For example, the privacy component 230 receives a boundary drawn around an item to be redacted by the user. The privacy 230 can redact all items within the boundary or infer an item to be removed within the drawn boundary to allow for an error correction of the user drawn boundary.

In other embodiments, the user can receive an identification of the will from the AR component 112, and select the identified will to be redacted. The privacy component 230 receives the boundaries or the privacy selections and redacts the augmented image of the locker such that the items cannot be seen in the image. The privacy component 230 can define pixels within the image for redaction based on the received selections and change the pixels such that the items are redacted.

In other embodiments, the privacy component 230 can receive a privacy level selection from a user. The privacy level can be low, medium, or high. The AR component 112 determines items to be redacted from the augmented image based on the privacy level selection. The AR component 112 redacts one or more items within the image such that the one or more items do not appear in the annotated image.

The AR component 112 includes an image store 240. The augmented images can be stored in the image store 240 to be provided to a user and/or to facilitate future augmented images of the locker 102 associated with the user or other lockers. The image store 240 stores the tags and relevant associations such as user, locker identification, financial institution, location, and/or the like. In some embodiments, the image store 240 can store an augmented image that is stripped of associations to facilitate future identification of items in other lockers not associated with the user.

The AR component 112 can include a machine learning component 250. The machine learning component 250 can train the identification component 210 to better recognize items in the locker 102. In some embodiments, the machine learning component 250 can be locker specific to the user where the machine learning component 250 can use previous images of the same locker to facilitate identification of items within the same locker. In other embodiments, the machine learning component 250 can be general to the images to train the identification component 210 to identify similar items in other lockers having images to be augmented.

Figure 3:
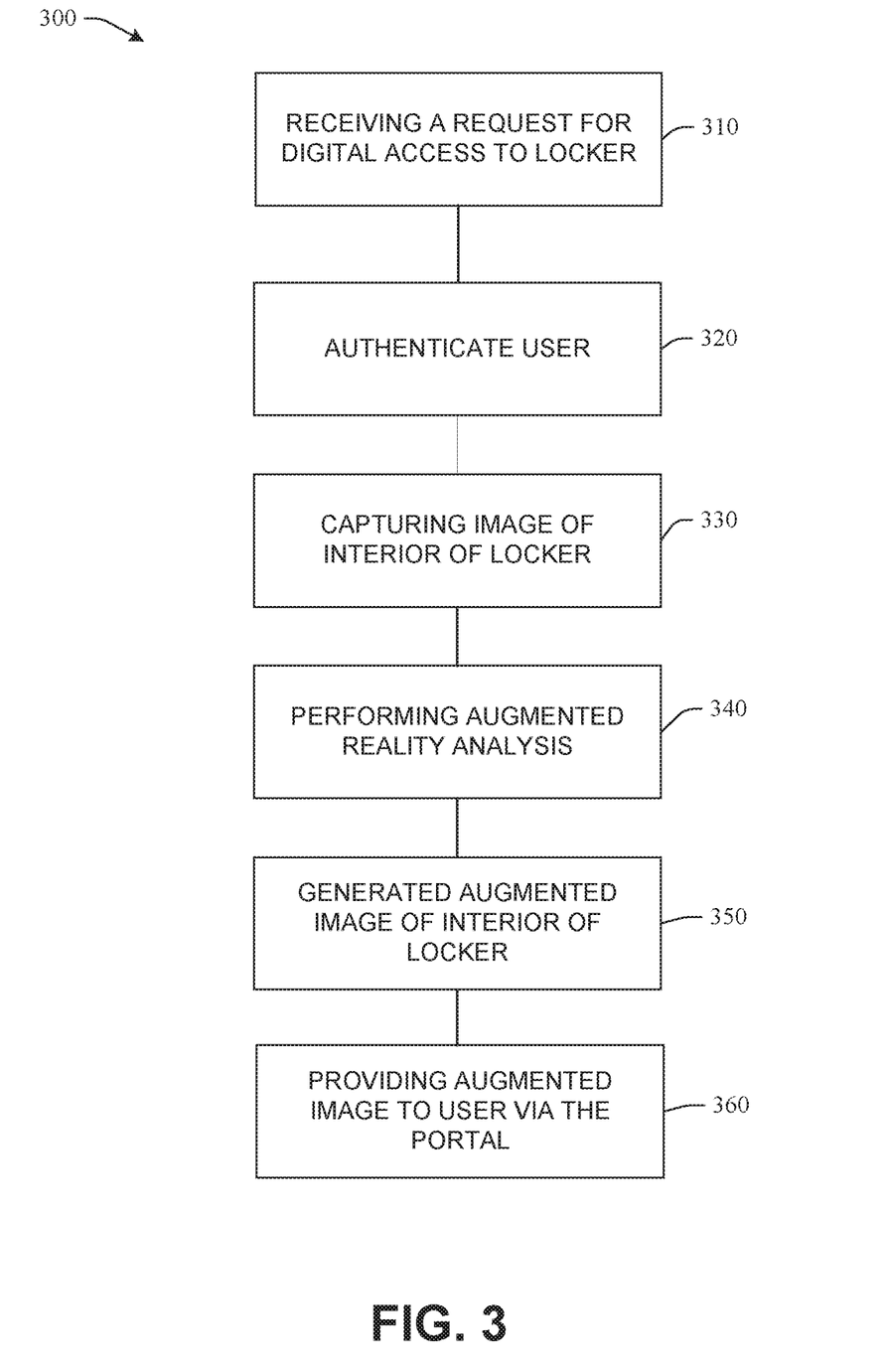
FIG. 3 illustrates a method for providing augmented locker images to a user.

With reference to FIG. 3, example methods 300 are depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 300 are described in conjunction with a specific example is for explanation purposes.

FIG. 3 illustrates a method 300 for providing augmented images for a safe locker. The method 300 can begin at 310 by receiving a request from a user for digital access to a locker associated with the user. The request can be made on a user device that is connected to a portal used to provide access to images of lockers. At 320, the user is authenticated. The user can be authenticated via password, one time passcode sent to user device, multi-factor authentication, biometric authentication, and/or the like. The authentication ensures a user can only access the locker(s) associated with the user and not anybody else. The authentication also ensures a person other than the user associated with the locker can access images of the locker.

At 330, an image of the interior of the user's locker is captured. In this embodiment, the capture is triggered by the user after being authenticated. The trigger ensures that the most recent images of the locker are provided to the user. Other conditions to capture an image of the locker are described in detail above. At 340, the captured image is analyzed using augmented reality and/or identification algorithms. The analysis can identify items within the captured image and located within/inside the locker.

At 350, an augmented image is generated from the analysis, tags, and original image. The augmented image can include tagging parts of the image as part of an identified item. The tagging can include associating a set of pixels in the image that include the identified item with a tag. The tag can appear overlaid on top of the image to annotate the image when viewed, scrolled/moused over, selected, and/or the like. In some embodiments, the augmented image can be interactive.

At 360, the augmented image is provided and/or displayed to the user via the portal and/or the user device. The augmented image can be sent to the user device and viewed on the user device in a augmented reality viewer, browser, and/or the like. The augmented image can be sent via the portal while the user is connected to the portal. In some embodiments, the user may correct or fix incorrect tags or identifications. In other embodiments, the user may provide a unique identification or tag for an item and change the tag. The changes or fixes may be stored in an inventory, image store, and/or the like. A machine learning component may use corrections to facilitate future identifications by an AR component and/or identification component.

Figure 4:
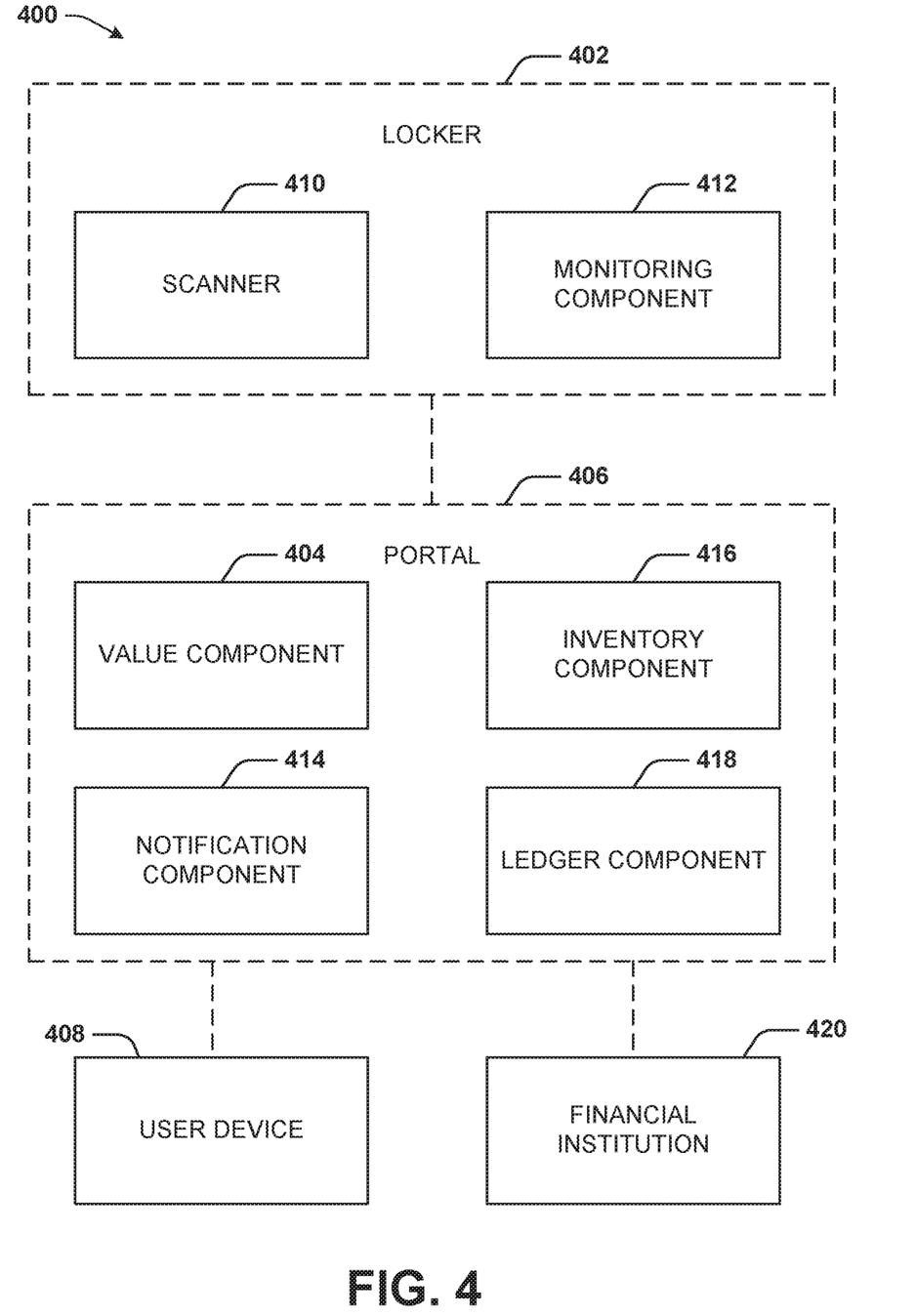
FIG. 4 illustrates an example component diagram of a system for valuation of a safe locker.

FIG. 4 illustrates a detailed component diagram of an embodiment of a system 400 for valuation of a safe locker. The system 400 includes a locker 402. The locker 402 is a secured space and/or area that can be locked via a locking mechanism (not shown) and/or the like. The locker 402 can be a safety deposit box, secure locker, lockbox, safe, vault, and/or the like. In some embodiments, the locker 402 is a safety deposit box associated with a financial institution and is physically located in a vault of a branch of the financial institution.

The system 400 includes a value component 404. The value component 404 evaluates one or more items placed inside the locker 402. The value component 404 can determine digitized metrics for the one or more items inside the locker 402. The digitized metrics can be determined information about an item(s) within the locker. For example, the digitized metrics can be dimensions (length, height, width), volume, weight, images, video, material, material composition, manufacturer, model number, design, ornamentation, distinctive marks, and/or the like. The value component 402 is discussed in further detail below.

The system 400 includes a portal 406. The portal 406 provides access to the digitized metrics of the plurality of items. The portal 406 can be an access point for a user or owner associated with the locker 402 to view digitized metrics of the items of the locker 402. In some embodiments, the portal 406 is a web site accessible over servers and/or the internet. In some embodiments, the value component 406 is integrated into the portal 406 that is remote from the locker 402. In other embodiments, the value component 404 is integrated within the locker 402. The value component 404 determines the digitized metrics and provides the digitized metrics to the portal 406. The portal 406 can be accessed by a user device 408 associated with the user or owner. In some embodiments, the portal 406 can provide the digitized metrics associated with the user's locker 402 to the user device 408.

The locker 402 includes a scanner 410. The value component 404 can operate in tandem with the scanner 410 to determine the digitized metrics. The scanner 410 can analyze or otherwise capture information of items within the locker 402. The value component 404 can receive the digitized metrics from the scanner to facilitate determining a value of an item in the locker 402. In some embodiments, the scanner 410 includes various hardware and software implementations to determine information of items within the locker. For example, the scanner 410 can include a camera, microphone, hyperspectral imager, x-ray, spectrometer, scale, and/or the like.

In some embodiments, the scanner 410 determines a material, material composition, weight of the item, and/or the like. The scanner 410 can use spectroscopy and/or the like to analyze an item placed within the locker 402 to determine a material and/or material composition. The scanner 410 can include a scale and/or volume and density metrics to determine the weight of the item. For example, the scanner 410 can analyze a gold bar placed within the locker 402 to determine the material as gold and the material composition as 24-karat. The scanner 410 determines the weight of the 24-karat gold bar.

The value component 404 can calculate a value of the item based on a determined market price of the material and the weight of the item. In some embodiments, the value component 404 can look up a market price by weight from a marketplace for the determined material and composition. In other embodiments, the value component 404 can utilize an average or predetermined price by weight to determine the value of the item.

In some embodiments, the value component 404 can value the item based on an identification of the item. The scanner 410 captures at least one image of the interior of the locker 402 such that the image frames the item or plurality of items. The value component 404 can receive the image(s) from the scanner 410. The value component 404 can utilize recognition algorithms to identify the item. For example, the item is a purse with distinctive markings or trademarks. The value component 404 can use a recognition algorithm to determine the manufacturer associated with the trademarks.

In some embodiments, the recognition algorithm can determine a model of the manufacturer. The value component 404 determines a market price from a marketplace for the item. In the example, the value component 404 can determine a price by accessing an auction website or the manufacturer's website to determine the value of the purse. In some embodiments, the value component 404 can evaluate ornamental aspects of the item from the images received from the scanner 410. The value component 404 can factor the ornamental aspects into the determined value of the item.

The locker 402 can include a monitoring component 412. The monitoring component 412 can determine the locker 402 has been accessed. In some embodiments, the monitoring component 412 detects movement of the locker 402 to determine the locker 402 has been moved. In other embodiments, the monitoring component 412 is a light sensor to detect when the locker 402 is or has been opened. In another embodiment, the monitoring component 412 is connected to the locking mechanism of the locker 402 to determine when the locker 402 has been unlocked and/or locked. The monitoring component 412 determines a change condition of the locker 402 and can trigger a notification component 414 of the portal 406. The notification component 414 can generate and send a notification to the user device 408 of the owner regarding the detected physical access to the locker 402

The portal 406 includes an inventory component 416. The inventory component 416 can create and store a list of items within the locker 402. The inventory list including valuations of each item in the plurality of items and a total valuation of the plurality of items within the locker. The user may access the list via the portal 406 and/or inventory component 416. In some embodiments, the notification component 414 can generate an email, and/or notification and communicate the list to the user and/or the user device 408. In some embodiments, the inventory component 416 automatically updates the inventory list upon the monitoring component 412 detecting access to the locker.

In some embodiments, the portal 406 includes a ledger component 418. The ledger component 418 generates an identification key for the locker 402. The identification key can include a value of the plurality of items and ownership information. In some embodiments, the identification key can be a hashgraph, code, and/or the like. The ledger component 418 generates a distributed ledger for the locker 402 and/or the items in the locker 402. The ledger component 418 stores the distributed ledger in a decentralized location. In some embodiments, the ledger component 418 is a hashgraph, blockchain, and/or other distributed ledger implementation. The distributed ledger is a recordation of the location and/or ownership of the locker 402. In some embodiments, the distributed ledger can record other data about the locker 402 such as number of times accessed or moved, ownership transfers, and/or the like.

In some embodiments, the ledger component 418 can update the distributed ledger with information of the locker 402 such as location, ownership, valuation, and/or the like. In other embodiments the ledger component 418 receives an update to the distributed ledger from a financial institution 420 that is securing and/or managing the locker 402.

Figure 5:
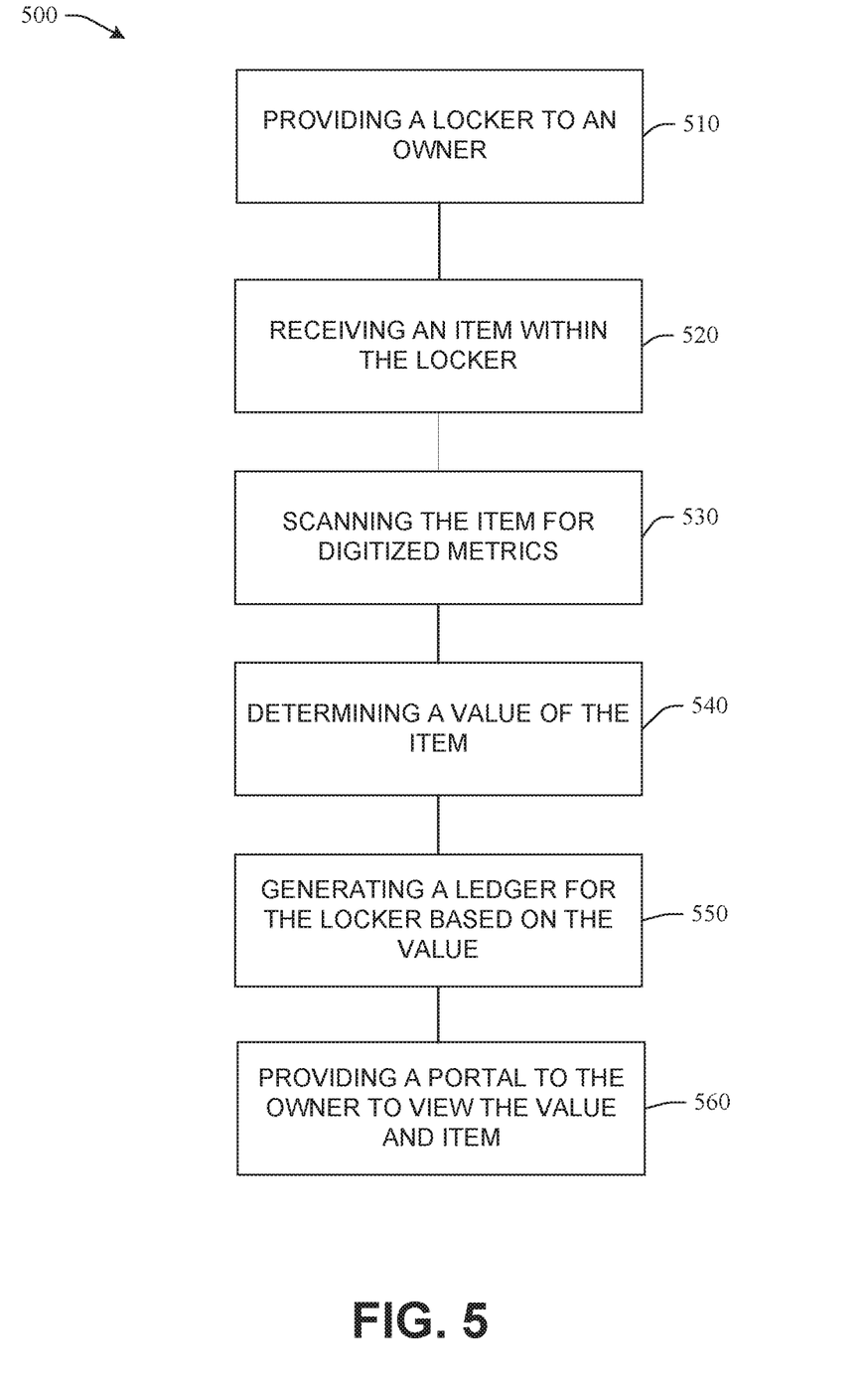
FIG. 5 illustrates a method for valuation of a safe locker.

FIG. 5 illustrates an example method 500 for valuation of a safe locker. At 510, a locker is provided to an owner. In some embodiments, the owner is a customer of a financial institution and has requested a locker or safety deposit box that the financial institution will secure. At 520, an item is placed within the locker. For example, the owner can place a gold box within the locker. At 530, the item is scanned for digitized metrics while inside the locker. In the example, the gold box can be scanned or otherwise analyzed to determine material (e.g. gold), material composition (e.g. 24-karat), weight (e.g. 1 pound), dimensions, imaging, video, ornamental aspects, distinctive marking, and/or the like. At 540, a value of the item is determined. Continuing the example, the gold box can be valued according to its weight and a market price for the material composition, e.g. price per pound rate for 24-karat gold. In some embodiments, the locker valuation can be used as collateral for financial institution services such as loans and/or the like.

At 550, a ledger for the locker is generated. The ledger is a distributed ledger such as hashgraph, blockchain, and/or the like. The ledger can include locker information such as valuation, ownership, financial institution, and/or the like. At 560, a portal is provided to the owner of the locker. The portal can be a website, mobile application, and/or the like to provide the digitized metrics, valuation, location, and/or other information about the locker to the owner. In the example, the owner can view the value of the gold box within the locker. In some embodiments, the valuation can be calculated using real time or near real time market prices such that the owner can track fluctuations in the value of the gold box as the market changes. In some embodiments, the owner can receive notifications or alerts via the portal when the valuation reaches predetermined value thresholds.

Figure 6:
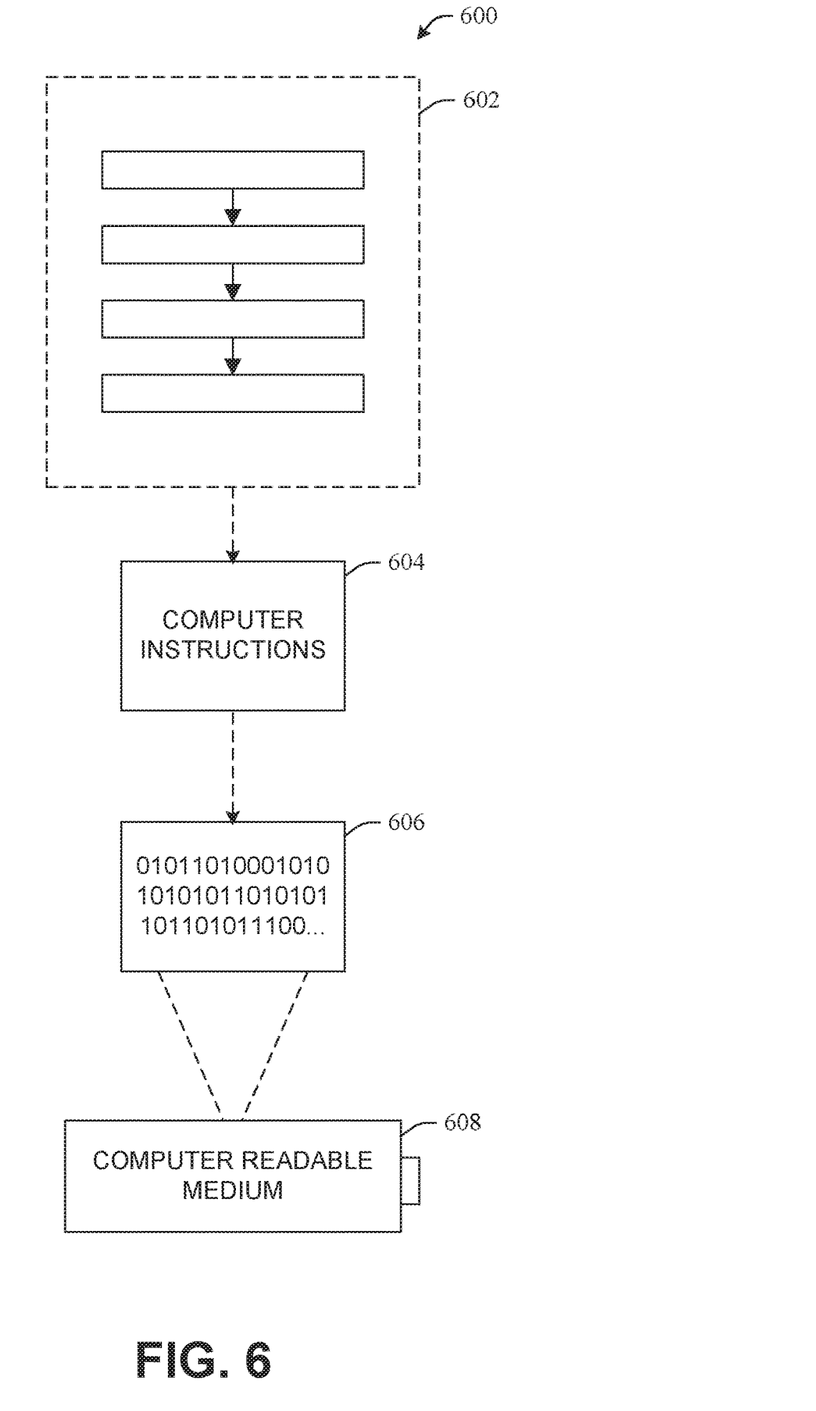
FIG. 6 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 6, wherein an implementation 600 comprises a computer-readable medium 608, such as a CD-R, DVD-R, flash drive, a platter of a hard disk drive, etc., on which is encoded computer-readable data 606. This computer-readable data 606, such as binary data comprising a plurality of zero's and one's as shown in 606, in turn comprises a set of computer instructions 604 configured to operate according to one or more of the principles set forth herein. In one such embodiment 600, the processor-executable computer instructions 604 is configured to perform a method 602, such as at least a portion of one or more of the methods described in connection with embodiments disclosed herein. In another embodiment, the processor-executable instructions 604 are configured to implement a system, such as at least a portion of one or more of the systems described in connection with embodiments disclosed herein. Many such computer-readable media can be devised by those of ordinary skill in the art that are configured to operate in accordance with the techniques presented herein.

With reference to FIG. 5 and the following discussion provide a description of a suitable computing environment in which embodiments of one or more of the provisions set forth herein can be implemented. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

Figure 7:
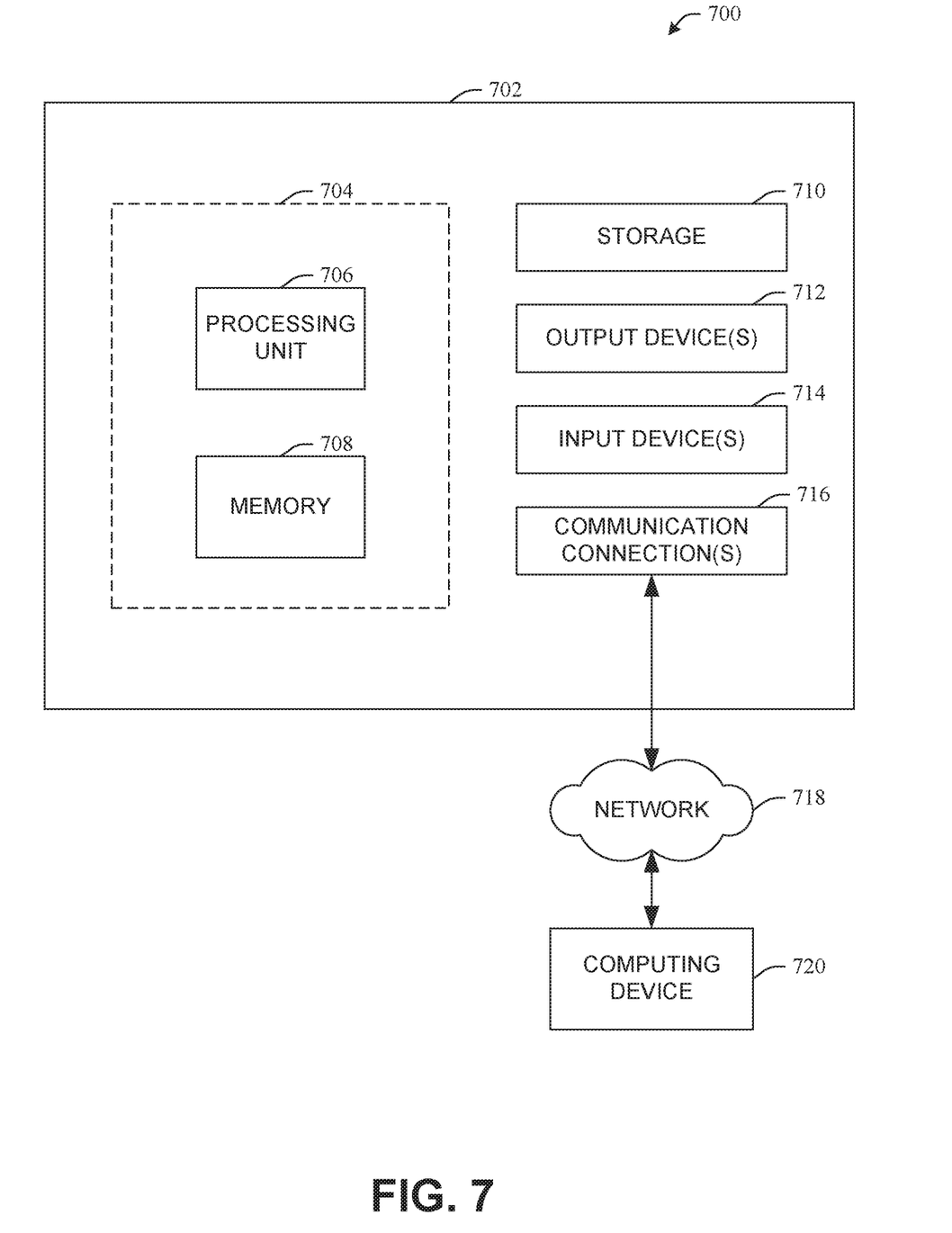
FIG. 7 illustrates a computing environment where one or more of the provisions set forth herein can be implemented, according to some embodiments.

FIG. 7 illustrates a system 700 comprising a computing device 702 configured to implement one or more embodiments provided herein. In one configuration, computing device 702 can include at least one processing unit 706 and memory 708. Depending on the exact configuration and type of computing device, memory 708 may be volatile, such as RAM, non-volatile, such as ROM, flash memory, etc., or some combination of the two. This configuration is illustrated in FIG. 7 by dashed line 704.

In these or other embodiments, device 702 can include additional features or functionality. For example, device 702 can also include additional storage such as removable storage or non-removable storage, including, but not limited to, magnetic storage, optical storage, and the like. Such additional storage is illustrated in FIG. 7 by storage 710. In some embodiments, computer readable instructions to implement one or more embodiments provided herein are in storage 710. Storage 710 can also store other computer readable instructions to implement an operating system, an application program, and the like. Computer readable instructions can be accessed in memory 708 for execution by processing unit 706, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media can be part of device 702.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 702 can include one or more input devices 714 such as keyboard, mouse, pen, voice input device, touch input device, infrared cameras, video input devices, or any other input device. One or more output devices 712 such as one or more displays, speakers, printers, or any other output device can also be included in device 702. The one or more input devices 714 and/or one or more output devices 712 can be connected to device 702 via a wired connection, wireless connection, or any combination thereof. In some embodiments, one or more input devices or output devices from another computing device can be used as input device(s) 714 or output device(s) 712 for computing device 702. Device 702 can also include one or more communication connections 716 that can facilitate communications with one or more other devices 720 by means of a communications network 718, which can be wired, wireless, or any combination thereof, and can include ad hoc networks, intranets, the Internet, or substantially any other communications network that can allow device 702 to communicate with at least one other computing device 720.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   providing a locker that is accessible via a portal, wherein the locker facilitates storage of a plurality of items;
   capturing an image of the plurality of items;
   evaluating at least one of the plurality of items placed inside the locker for digitized metrics wherein the evaluating comprises:
      scanning at least one item of the plurality of items; and
      determining a value of the at least one item based on the scanning as one of the digitized metrics; and
   providing the portal for the locker such that an owner of the locker has exclusive access to the image of the plurality of items and the digitized metrics;
   performing augmented reality analysis on the image, wherein the augmented reality analysis includes:
      identifying items within the locker using recognition algorithms;
      associating the items with identified labels:
      annotating the captured image with the identified labels, wherein the annotations are overlaid onto the captured image to create an augmented reality image of the locker
      receiving a privacy level selection;
      determining items to be redacted from the annotated image based on the privacy level selection; and
      redacting one or more items within the annotated image such that the one or more items do not appear in the annotated image.

2. The method of claim 1, the scanning comprising:
   determining a material, material composition, and weight of the item;
   calculating a value of the item based on a determined market price of the material and the weight of the item.

3. The method of claim 1, the scanning comprising:
   capturing an image of an interior of the locker such that the image frames the plurality of items;
   identifying items within the locker using recognition algorithms;
   associating the items with identified labels to determine manufacturer;
   determining a market price from a marketplace database.

4. The method of claim 1, the scanning comprising:
   capturing an image of the item of the plurality of items;
   evaluating ornamental aspects of the item; and
   factoring the ornamental aspects into the determined value of the item.

5. The method of claim 1, comprising:
   detecting physical access to the locker; and
   automatically generating and sending a notification to the owner regarding the detected physical access to the locker.

6. The method of claim 5, comprising:
   determining an inventory list of the plurality of items in the locker, the inventory list including valuations of each item in the plurality of items and a total valuation of the plurality of items within the locker; and
   automatically updating the inventory list upon detecting access to the locker.

7. The method of claim 1, comprising:
   generating a key for the locker, wherein the key includes a value of the plurality of items and ownership information.

8. The method of claim 7, comprising:
generating a distributed ledger for the locker using the key, wherein the distributed ledger can be updated with changes to an updated determined value of the plurality of items within the locker.

9. A system, comprising:
a locker that can hold one or more items for an owner, wherein the locker facilitates storage of a plurality of items;
an evaluation component that evaluates at least one of the plurality of items placed inside the locker for digitized metrics; and
a portal that provides access to the digitized metrics of the plurality of items
an augmented reality component that performs augmented reality analysis on the image, wherein the augmented reality analysis includes:
  identifying items within the locker using recognition algorithms;
  associating the items with identified labels:
  annotating the captured image with the identified labels, wherein the annotations are overlaid onto the captured image to create an augmented reality image of the locker
  receiving a privacy level selection;
  determining items to be redacted from the annotated image based on the privacy level selection; and
  redacting one or more items within the annotated image such that the one or more items do not appear in the annotated image.

10. The system of claim 9, comprising:
a scanner that scans at least one item of the plurality of items to determine digitized metrics; and
a value component that determines a value of the at least one item based on the scanning.

11. The system of claim 10, comprising:
wherein the scanner determines a material, material composition, and weight of the item; and
wherein the value component calculates a value of the item based on a determined market price of the material and the weight of the item.

12. The system of claim 10, comprising:
wherein the scanner:
  captures an image of an interior of the locker such that the image frames the plurality of items;
  identifies items within the locker using recognition algorithms; and
wherein the value component determines a market price from a marketplace database.

13. The system of claim 10, comprising:
wherein the scanner captures an image of the item of the plurality of items; and
wherein the value component:
  evaluates ornamental aspects of the item; and
factors the ornamental aspects into the determined value of the item.

14. The system of claim 9, comprising:
a monitor component that detects physical access to the locker; and
a notification component that generates and sends a notification to the owner regarding the detected physical access to the locker.

15. The system of claim 14, comprising:
an inventory component that:
  determines an inventory list of the plurality of items in the locker, the inventory list including valuations of each item in the plurality of items and a total valuation of the plurality of items within the locker; and
  automatically updates the inventory list upon detecting access to the locker.

16. The system of claim 9, comprising:
a ledger component that generates an identification key for the locker, wherein the identification key includes a value of the plurality of items and ownership information.

17. The system of claim 16, comprising:
wherein the ledger component generates a distributed ledger for the locker using the key, wherein the distributed ledger can be updated with changes to an updated determined value of the plurality of items within the locker.

18. A non-transitory computer readable medium, comprising instructions to control one or more processors configured to:
provide a portal to digitally access a locker by a user;
provide a locker that is accessible via the portal, wherein the locker facilitates storage of a plurality of items;
scan at least one of the plurality of items placed inside the locker for digitized metrics, wherein the scanning includes capturing an image of the plurality of items; and
determine a value of the item based on the scan and the digitized metrics;
perform augmented reality analysis on the image, wherein the augmented reality analysis includes:
  identifying items within the locker using recognition algorithms;
  associating the items with identified labels:
  annotating the captured image with the identified labels, wherein the annotations are overlaid onto the captured image to create an augmented reality image of the locker
  receiving a privacy level selection;
  determining items to be redacted from the annotated image based on the privacy level selection; and
  redacting one or more items within the annotated image such that the one or more items do not appear in the annotated image.

19. The non-transitory computer readable medium of claim 18, wherein the one or more processors are further configured to:
generate a distributed ledger for the locker, wherein the distributed ledger can be updated with changes to an updated determined value of the plurality of items within the locker.

* * * * *